United States Patent [19]

Miskiewicz

[11] 4,038,058

[45] July 26, 1977

[54] ROTARY-TYPE AIR FILTER ASSEMBLY

[76] Inventor: Leonard A. Miskiewicz, 219 Sprucewood St., Pittsburgh, Pa. 15210

[21] Appl. No.: 668,848

[22] Filed: Mar. 22, 1976

[51] Int. Cl.² .............................................. B01D 50/00
[52] U.S. Cl. ..................................... 55/317; 55/337; 55/405; 55/430; 55/502; 55/510
[58] Field of Search ................. 55/317, 337, 351, 352, 55/385 B, 393, 404, 405, 408, 409, 430, 459 R, 459 A, 459 B, 459 C, 459 D, 502, 509, 510, DIG. 28

[56] References Cited

U.S. PATENT DOCUMENTS

| | | | |
|---|---|---|---|
| 1,302,716 | 5/1919 | Sargent | 55/DIG. 28 |
| 1,806,898 | 5/1931 | Goodloe | 55/352 |
| 3,186,389 | 6/1965 | Sylvan | 55/351 |
| 3,402,881 | 9/1968 | Moore et al. | 55/405 |
| 3,421,294 | 1/1969 | Sherburn | 55/459 D |
| 3,898,066 | 8/1975 | Miskiewicz | 55/317 |

*Primary Examiner*—Bernard Nozick
*Assistant Examiner*—David L. Lacey
*Attorney, Agent, or Firm*—Brown, Murray, Flick & Peckham

[57] ABSTRACT

A carrier frame supports a renewable filter cartridge for rotation within a filter housing that includes an annular side wall with an air inlet and a bottom wall having an air discharge opening communicating with a carburetor for an internal combustion engine. A pedestal supports the carrier frame via an anti-friction bearing within the filter housing. The pedestal has diammetrically-opposed annular wall segments that close the airflow space between two adjacent arcuately-shaped impellers that join together upper and bottom cover plates forming part of the carrier frame. The upper cover plate has an outer diameter that corresponds to the annular opening in the renewable filter cartridge while the bottom cover plate has an outer diameter that is approximately equal to the outside diameter of the renewable filter cartridge for support thereof. The bottom cover plate additionally supports vertically-extending fins located at the outer peripheral surface of the filter cartridge. Incoming air impinges upon the blades, if provided, at the outer face surface of the renewable filter cartridge and the air passing through the filter cartridge impinges upon the turbine blades located within the carrier frame to rotate the filter cartridge and carrier frame.

10 Claims, 3 Drawing Figures

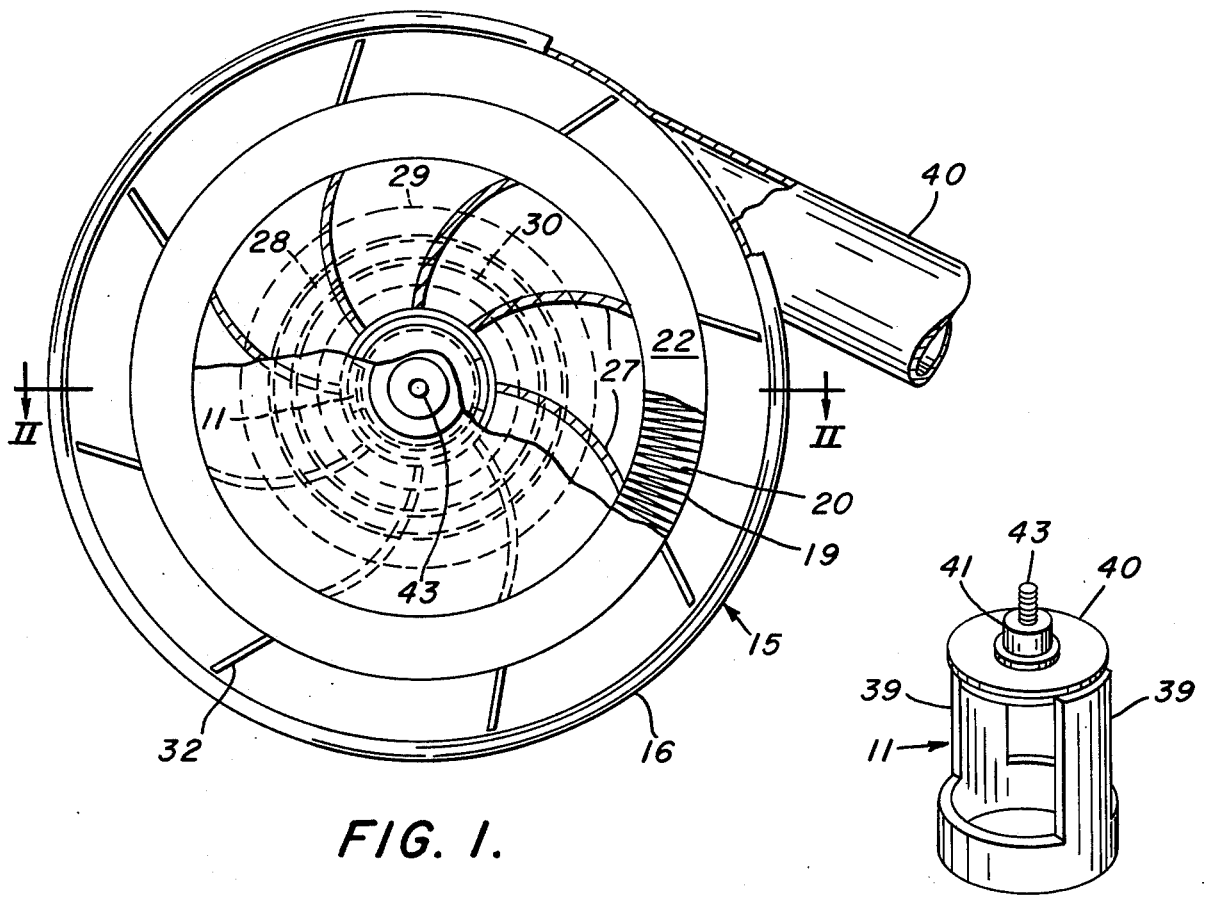
FIG. 1.
FIG. 3.
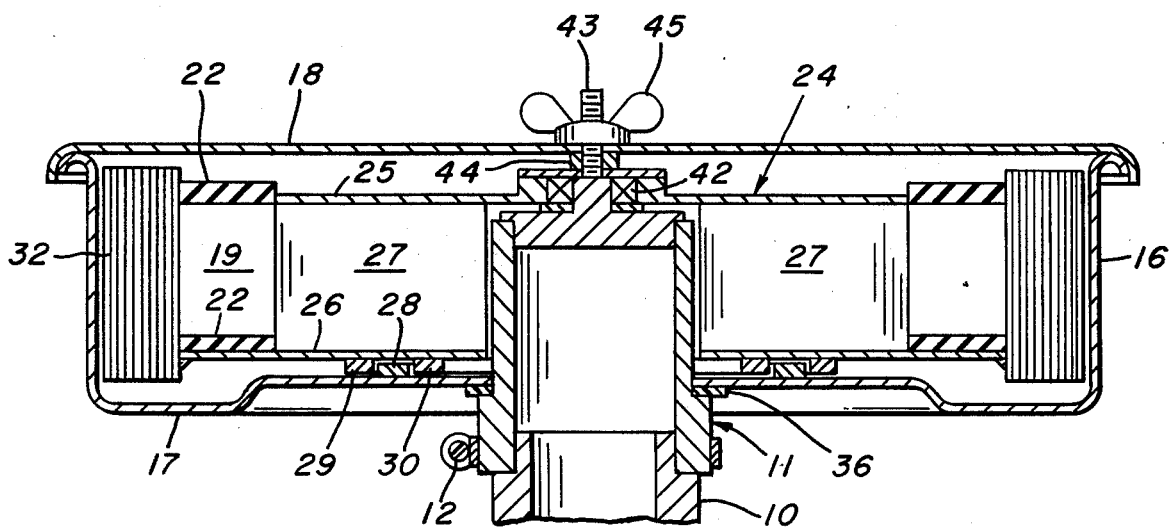
FIG. 2.

ROTARY-TYPE AIR FILTER ASSEMBLY

BACKGROUND OF THE INVENTION

This invention relates to an improved construction and relationship of parts to support and impart rotary motion to a renewable air filter cartridge located within a filter housing for supplying filtered air to the carburetor of an internal combustion engine. More particularly, the present invention relates to support apparatus incorporating impeller means contacted by filtered air for rotating the renewable filter cartridge and at the same time an arrangement of parts to bring about a periodic interruption of the flow of air through a small segment of the filter cartridge for releasing adhered particulate matter under the influence of a centrifugal force to thereby clean the renewable filter cartridge during the filtering operation.

As is well known in the art, the carburetor of an internal combustion engine is provided with an air filter assembly to deliver filtered air through an opening in the bottom of a housing which has an annular shape and includes a removable cover to permit replacement of the renewable filter cartridge. The housing of the air filter assembly has a hollowed-out shape and provided with an annular gasket on its floor surface in a surrounding relation with the air discharge port communicating with the carburetor. The gasket is used to form an airtight seal with the bottom surface of the filter which is also sealed in an airtight manner by a gasket provided on the cover for the housing. The incoming air delivered through an opening in the side wall of the housing is drawn through the filter cartridge by negative air pressure in the carburetor.

I have discovered that this construction of an air filter assembly has brought about an inefficient filtering system for air because the incoming air passing into the filter housing is drawn preferantially through the immediate periperhal surface which is most adjacent to the air inlet pipe with respect to the filter cartridge. As s result, a very small segment of the air filter cartridge filters a significantly greater volume of air while the remaining segmental portion of the filter cartridge contributes far less to the filtering of air. As the portion of the air filter cartridge most adjacent the air inlet pipe becomes clogged, passage of air through the filter is lessened because there is an increasingly larger portion of air that must travel a longer distance around the filter cartridge before passing through it, thus further increasing the air friction within the filter housing and reducing the amount of air supplied to the internal combustion engine. This, of course, deprives the internal combustion engine of the proper volume of air to effect an efficient and complete combustion of the air-gas mixture. This condition, of course, is ever changing in time because the filter cartridge, over a period of time, becomes clogged to a greater and greater extent.

In my prior U.S. Pat. No. 3,898,066, there is disclosed an air filter assembly wherein an annular filter element is supported for rotation within a housing. Turbine blades extend from cover plates at the top and bottom surfaces of the filter element. An air feed pipe opens out of the side wall of the housing for directing the incoming air in a direction tangentially toward the annular filter element for contact with the turbine blades to produce the desired rotation of the filter element. The filter element is rotatably supported by bearing surfaces carried either by the bottom wall of the housing or by interfitting annular flanges projecting from the top surface of the cover plate for the filter and the cover plate for the filter housing. While this prior form of an air filter assembly provides the desired feature of rotating the air filter and thereby overcome the aforementioned disadvantage in regard to a stationary filter element within a filter housing, it nevertheless suffers from the disadvantage that the arrangement and construction of parts employed to support the filter element for rotation are costly and cumbersome to disassemble for replacing the renewable filter element.

SUMMARY OF THE INVENTION

It is an object of the present invention to provide an improved arrangement of parts for supporting a renewable air filter cartridge within a filter housing coupled to a carburetor of an internal combustion engine in a manner such that the filter cartridge is caused to rotate within the filter housing by impingement of filtered and/or unfiltered air onto face surfaces of blade members.

It is a further object of the present invention to provide an improved construction and arrangement of parts to support a renewable air filter cartridge for rotation within an air filter housing so that the filter surface of a commercially-available filter cartridge is utilized to the greatest extent to filter the stream of incoming air while at the same time extending the usable life of the renewable filter cartridge.

It is a further object of the present invention to provide an improved construction and relationship of parts for supporting a renewable filter cartridge within a filter housing whereby the filter cartridge undergoes rotation to maintain efficient filtering of air which includes the periodic isolation of an arcuate segment of the filter cartridge for releasing particulate matter adhered to the outer periphery thereof.

It is still a further object of the present invention to provide an improved filter assembly wherein a renewable air filter cartridge forming part of the assembly is removable without disassembling parts employed to rotatably support the filter cartridge within a filter housing.

In accordance with the present invention, there is provided an air filter assembly for the carburetor of an internal combustion engine wherein the carburetor is coupled to an air discharge port in the bottom wall of a filter housing having a top wall and an annular side wal which includes an inlet opening for the passage of air into the housing and wherein the housing encloses a renewable filter cartridge having a web of filtered material supported between annular walls such that the filtering surface of the web faces toward the side wall of the filter housing, the improvement including the combination of a pedestal extending upwardly from the bottom wall of the filter housing, the pedestal having a tubular shape formed by a side wall with at least one opening therein to conduct filtered air into the carburetor, a carrier frame having a central annular bore adapted to receive the pedestal for rotation of the carrier frame within the filtering housing, the carrier frame including an upper cover joined to a bottom cover by spacer members disposed to form at least one passageway to conduct filtered air between the upper and lower covers into the opening in the side wall of the pedestal, the bottom cover having an annular support surface to receive and support the bottom annular wall of the renewable filter cartridge, the upper cover of the carrier frame having an annular outer edge adapted to pass through the opening in the top and bottom walls of the renewable filter cartridge whereby filtered air passing from the web of the filter cartridge flows into the passageway between the cover plates of the carrier frame, the spacer members including impeller means contacted by the current of air within the filter housing for rotating the carrier frame together with the renewable filter cartridge.

The improved filter assembly of the present invention preferably includes a plurality of radially-spaced blades extending from the central annular bore of the carrier frame into a closely-spaced relation from the renewable filter cartridge. The side wall of the pedestal preferably takes the form of diametrically-opposed arcuate wall segments each having a peripheral length to close the airflow space between an adjacent pair of the blades in a manner to block the flow of air through a corresponding segment of the renewable filter while releasing particulate matter adhered to the outer peripheral surface of the filter under the influence of a centrifugal force due to rotational movement of the filter cartridge within the housing. Turbine blades may be supported at spaced peripheral locations about the bottom cover plate to extend vertically and lie between the renewable filter cartridge and the face surface of the side wall forming the filter housing. When such turbine blades are employed, it is desirable that their face surfaces contain spaced ridges extending in a generally parallel direction along the height of the blade for directing particulate matter toward the bottom wall of the filter housing. An interfitting arrangement of concentrically-disposed rings forms a seal between the bottom cover of the carrier frame and the bottom wall of the filter housing.

These features and advantages of the present invention as well as others will be more fully understood when the following description is read in light of the accompanying drawings, in which:

FIG. 1 is a plan view, partly in section, of the air filter assembly embodying the features of the present invention;

FIG. 2 is a sectional view taken along line II—II of FIG. 1; and

FIG. 3 is a perspective view of a support pedestal shown in FIGS. 1 and 2 and forming part of the air filter assembly.

The air filter assembly shown in FIGS. 1-3 is of the type commonly employed to supply filtered air to a carburetor of an internal combustion engine. The carburetor is identified by reference numeral 10 in FIG. 2. The carburetor has at its upper edge a flange onto which a pedestal 11 is attached by means of a clamp 12. However, the pedestal may be secured to the air filter housing. The pedestal will be described in greater detail hereinafter. The air filter assembly is located within a housing 15 which has an annular shape provided by a side wall 16 connected about its lower edge to a bottom wall 17. A top wall 18 is releasably secured to the upper edge of the side wall in a manner such that the top wall is readily removable to expose the internal area in the housing wherein there is located a renewable air filter cartridge 19. It is preferred to employ an air filter cartridge that is presently commercially utilized in the auto industry and constructed in a well-known manner. The cartridge 19 includes radially-extending folds of a web of filter material 20 with the outer folded ends facing toward the side wall 16 of the filter housing 15 as shown in FIG. 1. The web of filter material extends between annular support walls 22 which are sometimes made of plastic or other elastic material and attached to the web of filter material by a molding process or glue. The filter cartridge has an internal bore formed by the inner peripheral edge of the annular walls 22 and web of filter material 19.

A carrier frame 24 is constructed according to the present invention to support the renewable filter cartridge for rotation within the filter housing. For this purpose, the carrier frame includes a top cover 25 which is circular and has a diameter adapted to be received within the annular bore in the filter cartridge. The top cover 25 is joined to a bottom cover 26 by a plurality of impeller members that preferably take the form of arcuate, radially-extending blades 27. These blades extend between the pedestal 11 and the renewable filter cartridge whereby filtered air is conducted within the space between the blades. Moreover, the impingement of the filtered air on the curve configuration of the blades imparts a torque to the carrier frame thereby producing the desired rotation thereof within the filter housing. Means are employed to provide a seal between the bottom cover 26 and the bottom wall 17 of the filter housing. These means preferably take the form of an annular ring 28 secured in concentric relation with the air discharge port formed in the bottom wall 17. The annular ring 28 projects into the gap formed between two concentric and spaced-apart rings 29 and 30 that are supported by the bottom cover 26.

The bottom cover 26 of the carrier frame 24 has a diameter that essentially corresponds to the outside diameter of the renewable filter cartridge whereby the portion of the bottom cover 26 projecting beyond the blades 27 forms a support surface for the renewable filter cartridge. Vertically-arranged turbine blades 32 are secured to the outer edge of the bottom cover at spaced, peripheral locations so that they extend vertically along the height of the filter cartridge. As indicated in FIG. 2, the turbine blades 32 are arranged to project in a radially-outward relation such that they form extensions to the blades 27 while the filter cartridge 19 is located between them. The turbine blades 32 preferably include ridges formed along their face surfaces to contact and direct particulate matter, entrained by the stream of incoming air, toward the bottom wall of the filter assembly where an annular trough forms a collection chamber to accumulate these particles.

Turning, now, to the pedestal 11, it includes an annular shoulder formed in the outer surface of its side wall to support a gasket 36 which is normally arranged between the shoulder and the air discharge port formed in the bottom wall 17 of the filter housing. The pedestal 11 projects upwardly from the shoulder portion into the filter housing. The projected portion of the pedestal is constructed so that two diametrically-opposite side walls 39 have an arcuate width that corresponds to the spacing between the inward terminal edges of two adjacent blades 27. The walls 39 carry, at their upper ends, an end cap 40 which has a circular shape and supports a vertically-extending arbor 41 that projects into and supports an anti-friction bearing 42 that is, in turn, received within an annular bore formed in the top cover plate 25. A threaded stud 43 projects vertically from the arbor 41. A spacer 44 is located on the arbor between the top cover 25 and the top wall 18 to maintain a desired spacing when a wing nut 45 or other suitable fastening member threadedly engages the studs for holding the top plate 18 onto the side wall 16 of the filter housing. The arcuate wall segments 39 forming part of the pedestal 11 block the flow of air between two adjacent blades in a manner to block the flow of air to a corresponding segment of the renewable filter while undergoing rotation within the filter housing. As this condition occurs, particulate matter on the outer face surface of the filter web is no longer adhered under the influence of the flow of air. Moreover, under the influence of a centrifugal force due to the rotation of the filter, such particulate matter, particularly larger particles, is thrown outwardly toward the side wall 16 of the filter housing where the particulate matter falls with or without contact with the blades 32 toward the bottom wall 17.

Air is supplied into the flter housing by a pipe 40 communicating with an opening in the side wall 16. It is preferred to arrange the pipe 40 so that it extends in a generally tangential relation with the renewable filter cartridge whereby the incoming flow of air contacts the blades 32 before passing through the web of filter material and then the blades 27 after filtering thereof to produce the desired rotation of the filter unit together with the carrier frame 24.

In light of the foregoing description, those skilled in the art will readily understand that replacement of the renewable filter cartridge 19 is readily effected by removing the wing nut 45 and thence the top cover 18. The filter cartridge 19 is then lifted vertically from the carrier frame without disassembling any of its parts. A replacement filter cartridge is then passed downwardly into a supporting relation with the bottom cover 26 of the carrier frame after which the cover 18 is replaced and secured by the wing nut 45.

It should be noted that the air filter assembly of the present invention includes an angularly-shaped rotary filter that is energized by the velocity of incoming air drawn into an internal combustion engine through a carburetor. This incoming air is directed tangentially toward the periphery of the filter cartridge causing rotation thereof to evenly distribute the excluded particulate matter around the outer diameter of the filter cartridge. The fins, located about the outer periphery of the filter element, facilitate the development of a desired speed of rotation. These fins are so biased to throw any impinging particulate matter in a predominantly downwardly direction away from the actual filter surface. The synchronized interruption of the flow of filtered air within the carrier member is analogous to a pulsating of the incoming column of air without detriment to he filtering operation but, instead, produces a highly desired release or precipitation of particulate matter being held against the periphery of the filter by virtue of the flow of incoming air.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In an air filter assembly for the carburetor of an internal combustion engine wherein the carburetor is coupled to an air discharge port in the bottom wall of a filter housing having a top wall and an annular side wall which includes an inlet opening for the passage of air into the housing and wherein said housing encloses a renewable filter cartridge having a web of filtered material supported between top and bottom annular walls such that the filtering surface of said web faces toward said side wall, the improvement including the combination of:

a pedestal extending upwardly from the bottom wall of said filter housing and in flow communication with said air discharge port, said pedestal having a tubular shape formed by a side wall with at least one opening therein to conduct filtered air into the carburetor, and a carrier frame, and means rotatably supporting said frame on said pedestal for rotation of the carrier frame within said filter housing, said carrier frame including an upper cover joined to a bottom cover by spacer members disposed to form at least one passageway to conduct filtered air between the upper and lower covers into said opening in the side wall of said pedestal, said bottom cover having an annular support surface to receive and support said bottom annular wall of said renewable filter cartridge, said upper cover having an annular outer edge received through the opening defined by said top and bottom annular walls of said renewable filter cartridge whereby filtered air passing from said web flows into the passageway between the cover plates of said carrier frame, said spacer members including impeller means for contacting a current of air within said filter housing for rotating said carrier frame together with said renewable filter cartridge.

2. The air filter assembly according to claim 1 wherein said impeller means include a plurality of radially-spaced blades extending from the center of the carrier frame into a closely-spaced relation from said renewable filter cartridge.

3. The air filter assembly according to claim 2 wherein the side wall of said pedestal defines diammetrically-opposed arcuate wall segments each for closing the airflow space between an adjacent two of said spaced blades in a manner to block the flow of air through a corresponding segment of said renewable filter while releasing particulate matter adhered to the outer periphery of the filter under the influence of a centrifugal force.

4. The air filter assembly according to claim 1 wherein said means rotatably supporting said carrier frame comprises bearing means arranged between said pedestal and the upper cover of said carrier frame for rotatable support of the latter.

5. The air filter assembly according to claim 1 further comprising an end cap secured to the upper end of said pedestal, and said rotatable support means comprises bearing means connected to said end cap to rotatably support said carrier frame.

6. The air filter assembly according to claim 1 further comprising a plurality of turbine blades extending outwardly beyond the outer annular edge of said bottom cover plate of said carrier frame, said plurality of turbine blades projecting vertically to extend between said renewable filter cartridge and the annular side wall of said filter housing.

7. The air filter assembly according to claim 6 wherein said plurality of turbine blades each has a face surface containing spaced ridges extending in a generally parallel direction along the height of said turbine blades for directing particulate matter toward said bottom wall of the filter housing.

8. The air filter assembly according to claim 1 further comprising sealing means forming a closure between the bottom cover of said carrier frame and said bottom wall of the filter housing.

9. The filter assembly according to claim 1 further comprising two concentrically-arranged and spaced-apart annular rings secured to the bottom face surface of said bottom cover of the carrier frame, and an annular ring secured to the upper face surface of said bottom wall of the filter housing at a location to form a concentric, interfitting relation within the space between said two concentricaly-arranged and spaced-apart annular rings.

10. The air filter assembly according to claim 1 further comprising an end cap secured to the upper end of said pedestal, and said rotatable support means comprises bearing means connected to said end cap to rotatably support said carrier frame, and fastening means supported by said end cap for releasably securing the top wall of said filter housing onto the annular side wall thereof.